Figures 1, 2:
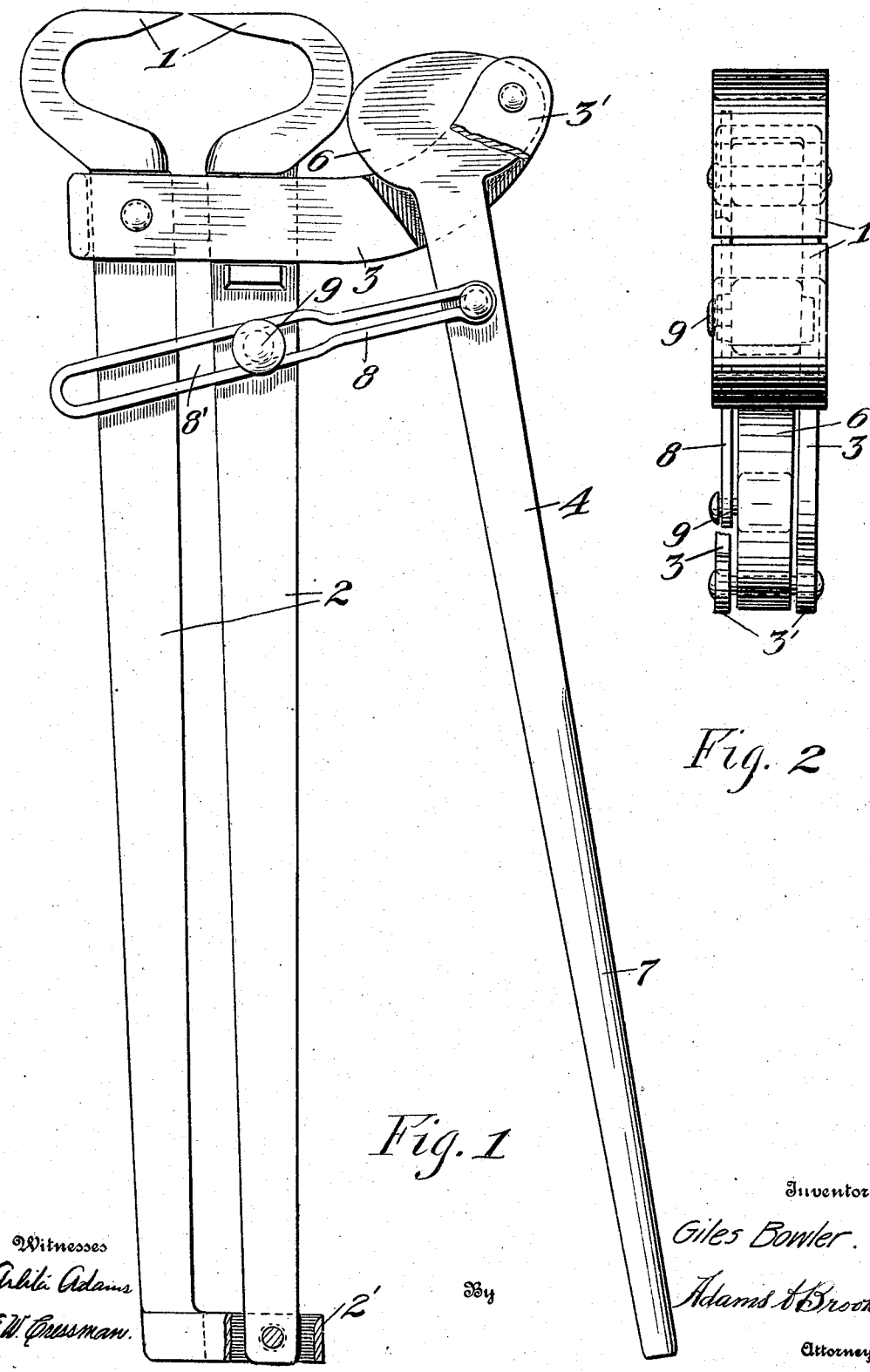

No. 847,980. PATENTED MAR. 19, 1907.
G. BOWLER.
CLIPPERS.
APPLICATION FILED MAR. 27, 1906.

Witnesses
Arlita Adams
E. W. Crussman.

Inventor
Giles Bowler.
By Adams & Brooks
Attorneys

UNITED STATES PATENT OFFICE.

GILES BOWLER, OF CAVENDISH, IDAHO, ASSIGNOR OF ONE-THIRD TO JOSEPH A. WALKER AND ONE-THIRD TO JOHN BIGLEY, OF PECK, IDAHO.

CLIPPERS.

No. 847,980.     Specification of Letters Patent.     Patented March 19, 1907.

Application filed March 27, 1906. Serial No. 308,352.

*To all whom it may concern:*

Be it known that I, GILES BOWLER, a citizen of the United States of America, and a resident of the city of Cavendish, in the county of Nez Perce and State of Idaho, have invented certain new and useful Improvements in Clippers, of which the following is a specification.

My invention relates to certain new and useful improvements in clippers of the type primarily intended for clipping of hoofs or nails or the like, and has for its primary object the production of an improvement of this character which while embracing but few parts will be powerful and very efficient in action.

A further object is to so mount the cutting-jaws that they will when operated for cutting move in an approximately straight path, thereby producing an even straight cut.

Other objects will be set forth as the description progresses and those features of construction upon which I desire protection defined in the appended claim.

In the accompanying drawing, in which like numerals of reference indicate like parts throughout the several views, Figure 1 is a view in side elevation of my improved cutting implement; and Fig. 2 is a top plan view thereof, parts being broken away.

My invention being particularly adapted for the trimming or clipping of hoofs of horses or like animals is constructed so that the cutting-jaws 1 will when operated move in a substantially straight path, thereby enabling the operator to trim or clip the hoof in an even manner. To obtain this result, I fix the jaws on the one end portions of suitable shanks 2, which are pivotally connected at their other ends, one having an offset 2', in which the adjacent end portion of the other shank is pivoted.

Reference-numeral 3 indicates arms fixed to one shank and embracing the other, and in these arms, to the outside of the last-named shank, I pivot a lever 4. This lever has its upper portion formed with a cam, as 6, and the lower portion of said lever serves as a handle 7, which can be readily grasped, and said cam is so arranged as to when the handle is swung toward the shank engage the adjacent shank and move the jaws toward one another for cutting.

Pivoted to lever 4 below its fulcrum is a link 8, which is slotted, as at 8', and receives in its slot a pin 9, fixed to the adjacent shank. The slot 8' is of such length as to have the pin 9 engage its inner end wall immediately after the cam 6 by outward swinging movement of the handle is disengaged from the shank, and therefore by continued outward movement of said handle the shank to which the link is connected will be pulled from the other, thereby opening the jaws.

In my improved construction it will be observed the jaws are positively operated both in opening and closing by swinging of the lever 5 in opposite directions. By employing the cam-and-lever means sufficient leverage is obtained for closing the jaws, as for cutting, to insure of the cutting of tough bodies with the requirement of but little power being exerted by the operator. The eccentric is intended to effect closing of the cutting-jaws before its portion of greatest eccentricity passes above the pivot of the lever, thereby exerting a pull on the farther shank and forcing that shank on which it has a direct bearing, and in the present showing the arms 3 have their outer free portions curved upwardly, as at 3', and the upper end portion of the lever pivoted therein, whereby the point of swing of the lever is above that portion of the surface of the shank engaged by the eccentric, and thereby allowing the handle to have a swing of considerable length to effect the closing of the jaws.

Having thus fully described my invention, what I claim as new, and desire to secure by Letters Patent of the United States, is—

A cutting implement consisting of shanks pivotally connected and provided with cutting-jaws at their upper end portions, a lever arranged at the outer side of one shank, a means in which said lever is pivoted fixed to the other shank and projecting beyond said first shank, the upper end portion of said lever being formed with a cam engaging the adjacent shank, a pin on said last shank, and a link pivoted to said lever below its fulcrum, said link being formed with a slot and having said pin arranged therein, for the purpose specified.

Signed at Seattle, Washington, this 12th day of March, 1906.

GILES BOWLER.

Witnesses:
   STEPHEN A. BROOKS,
   ARLITA ADAMS.